Feb. 8, 1966 M. E. BERGY ETAL 3,234,092
ACTINOSPECTACIN AND PROCESS FOR PRODUCING THE SAME
Filed Oct. 20, 1959
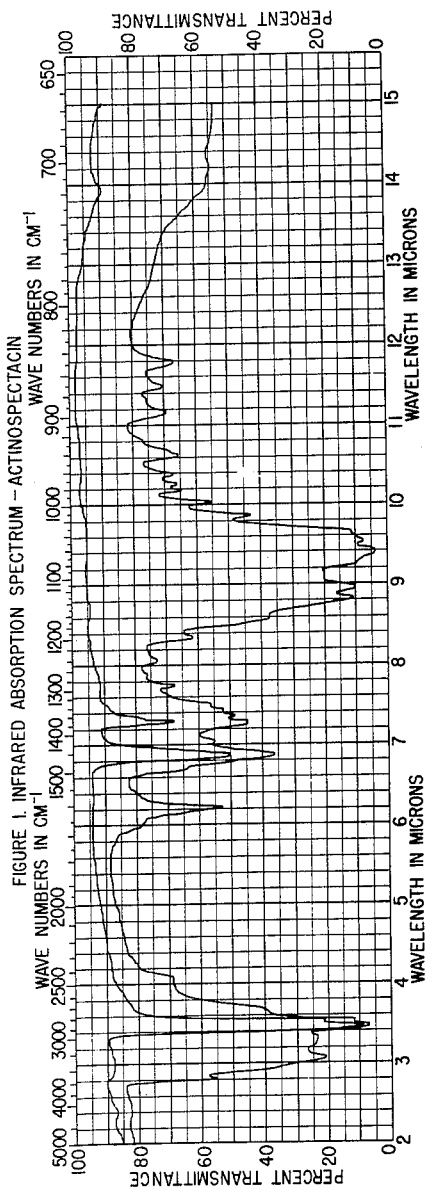
FIGURE 1. INFRARED ABSORPTION SPECTRUM — ACTINOSPECTACIN
MALCOLM E. BERGY
CLARENCE DE BOER
*INVENTORS*
*BY* EUGENE O. RETTER
GEORGE T. JOHANNESEN United States Patent Office 3,234,092
Patented Feb. 8, 1966

3,234,092
ACTINOSPECTACIN AND PROCESS
FOR PRODUCING SAME
Malcolm E. Bergy, Kalamazoo, and Clarence De Boer, Kalamazoo Township, Kalamazoo County, Mich., assignors to The Upjohn Company, Kalamazoo, Mich., a corporation of Delaware
Filed Oct. 20, 1959, Ser. No. 847,092
13 Claims. (Cl. 167—65)

This invention relates to a novel composition of matter and to the process for the production thereof. More particularly this invention relates to a new antibiotic, actinospectacin, to its acid addition salts, and to a process for the production thereof.

Actinospectacin is a biosynthetic product produced by the controlled fermentation of Streptomyces spectabilis. It has the property of adversely affecting the growth of microorganisms, particularly bacteria. It is a basic compound which can be used, either as the free base or as an acid addition salt thereof, to prevent the growth of or to reduce the number of microorganisms present in various environments. For example, wash solutions containing actinospectacin are useful for sanitation purposes, as in the washing of hands and the cleaning of equipment, floors, or furnishings of contaminated rooms or laboratories. Actinospectacin can also be used as a feed supplement to promote the growth of mammals and birds, either alone or in combination with other antibiotics. It can also be used for the selective control of the growth of microorganisms in biological media and as an industrial preservative, for example, as a bacteriostatic rinse for laundered clothes and for impregnating paper and fabrics to make them bacteriostatic.

A strain of Streptomyces spectabilis which is particularly effective for producing actinospectacin can be obtained from the permanent collection of the Fermentation Division, Northern Utilization Research Branch, U.S. Department of Agriculture, Peoria, Illinois, where it has been deposited as Streptomyces spectabilis NRRL 2792. Another suitable strain has been deposited as Streptomyces spectabilis NRRL 2494. S. spectabilis is described in British Patent 811,757 of April 8, 1959.

Actinospectacin is produced when S. spectabilis is grown in an aqueous nutrient medium under submerged aerobic conditions, and preferably, in a nutrient medium containing as a carbon source an assimilable carbohydrate, and as a nitrogen source, an assimilable nitrogen compound or a proteinaceous material. It is to be understood also that for the preparation of limited amounts, shaken flasks and surface cultures in bottles can be employed. Suitable carbon sources include glucose, molasses, starch, galactose, maltose, dextrin, glycerol, mannitol, glyceride oils, i.e., animal and vegetable oils, and combinations of such carbon sources. Suitable nitrogen sources include Brewer's yeast, yeast extract, distiller's solubles, distiller's dark grains, corn steep liquor, wheat germ meal, milk solids, meat extracts, corn gluten meal, fish stick liquor, animal stick liquor, fish meal, cottonseed meal, soybean meal, soya flour, peanut meal, defatted soybean meal, inorganic nitrogen, e.g., nitrate and ammonium salts, amino acids, peptones (meat, soya, egg, milk), peptone-containing products, for example: pancreatic hydrolysates and digests of casein such as N-Z-Amines A and B; tryptic digests of casein such as N-Z-Amine E, trypticase, and tryptone, and proteolyzed milk, meat, soya, and egg products. Combinations of two or more of these nitrogen sources can be used advantageously.

Nutrient inorganic salts, for example, salts capable of yielding ions such as potassium, sodium, calcium, phosphate, chloride, sulfate, and the like, can be incorporated advantageously in the medium. Essential trace elements such as zinc, magnesium, manganese, cobalt, iron, and the like, can also be included in the culture medium. Such trace elements are commonly supplied as concomitants incidental to the addition of the other constituents of the medium.

Production of the antibiotic can be effected at any temperature conducive to growth of the organism, for example between about 18–37° C. A relatively high temperature, however, say above 28° C. and preferably about 32° to 34° C., is preferred as the higher temperature favors the production of the antibiotic. Ordinarily, especially at the higher temperature, optimum production of the antibiotic is obtained in from 2 to 10 days. The culture medium, prior to inoculation with the microorganism, advantageously is adjusted to a pH between 7 and 8. The medium normally stays and should be alkaline during fermentation, the final pH being dependent, in part, on the initial pH of the culture medium, the buffers present, and the like.

When growth is carried out in large vessels and tanks, it is preferable to use the vegetative form of the microorganism for inoculation to avoid a pronounced lag in the production of antibiotic and the attendant inefficient utilization of the equipment. Accordingly, it is desirable first to produce a slant for example, on maltose-tryptone agar, which is inoculated with a lyophilized culture or a soil culture. A vegetative inoculum of the microorganism is then produced by inoculating a relatively small amount of liquid nutrient culture medium with inoculum scraped from the agar slant. When a young, active vegetative inoculum has thus been secured, it is transferred aseptically to large vessels or tanks. The medium in which the vegetative inoculum is produced can be the same as, or different from, that utilized for the production of the antibiotic as long as it is such that a good growth of the organism is obtained.

Actinospectacin is a dibasic, nitrogen base having a $pKa_1$ of 7 and a $pKa_2$ of 8.7. It is soluble in water, methanol, and ethanol, and insoluble in acetone and hydrocarbon solvents. As it is only difficultly soluble in water-immiscible organic solvents, it is desirable to effect its recovery and purification by adsorptive procedures including adsorption on adsorptive carbon, decolorizing resins, alumina gel, or like capillary adsorbents, or on cation exchange resins, followed by elution with a suitable eluting agent. It is advantageous in such procedures to have the antibiotic in the protonated form and for this purpose it is desirable to keep the fermented culture medium and recovery solutions at an acid or near neutral pH.

In accordance with a preferred procedure, the whole beer is filtered, adjusted, if necessary, to an acid or near neutral pH, suitably between pH 4 and pH 8, and brought into contact with adsorbent carbon. The antibiotic, still in the protonated or salt form, is then eluted from the carbon with water, ordinarily tap water or deionized water, to which may be added a small amount of a lower alkanone, for example acetone. The eluate can be acidified, if desired. The antibiotic can be recovered directly from the eluate by evaporation of the eluate to dryness. In place of carbon there can be used decolorizing resins like Permutit DR (U.S. Patent 2,702,263).

In another preferred procedure, the whole beer is filtered, adjusted, if necessary, to an acid or near neutral pH, suitably between pH 6 and pH 8, and brought into contact with a cation exchange resin in the hydrogen form. Both carboxylic and sulfonic acid types can be used. Suitable carboxylic acid resins include the polyacrylic acid resins obtained by the copolymerization of acrylic acid and divinylbenzene by the procedure given on page 87 of Kunin, Ion Exchange Resins, 2nd Ed. (1958), John Wiley and Sons, Inc. Carboxylic acid cation exchange resins of this type are marketed under the trade names Amberlite IRC–50 and Zeokarb 226. Suitable sulfonic acid resins include nuclear sulfonated polystyrene resins cross-linked with divinylbenzene obtained by the procedure given in page 84 of Kunin, supra. Sulfonated cation exchange resins of this type are marketed under the trade names, Dowex–50, Amberlite IR–120, Nalcite HCR, Chempro C–20, Permutit Q, and Zeokarb 225.

The protonated antibiotic is eluted from the resin with water at an acid pH, advantageously at a pH lower than the pKa of the cation exchange resin used. Satisfactory results are obtained with a pH of about 1 to 6. The excess acid in the eluate is neutralized to about pH 6 to 7, preferably with a strongly basic anion exchange resin so as to remove excess acid over that necessary to protonate the basic groups. Suitable anion exchange resins for this purpose are obtained by chlormethylating by the procedure given on pages 88 and 977 of Kunin, supra, polystyrene crosslinked, if desired, with divinylbenzene prepared by the procedure given on page 84 of Kunin, supra, and quaternizing with trimethylamine, or dimethylalkanolamine by the procedure given on page 97 of Kunin, supra. Anion exchange resins of this type are marketed under the trade names Dowex 2, Dowex 20, Amberlite IRA–400, Duolite A–102, and Permutit S–1.

After the antibiotic is recovered from the culture medium, it is further purified by repeated adsorption and elution or by partition or counter-current distribution procedures. For example, a preparation obtained by adsorption on one adsorbent can be purified by repeating the process, advantageously however, with a different adsorbent, as from ion exchange to capillary adsorption and vice versa. For an example, a preparation obtained with a cation exchange resin as described above can be further fractionated on a carbon chromatographic column in which the protonated antibotic is eluted from the carbon column with water, advantageously deionized water, which ordinarily has a pH of about 5 to 7, or tap water which ordinarily has a pH of about 6 to 7, to which may be added if desired in a small amount, say about 1 or 2%, of a lower alkanone, e.g., acetone. The eluate in this case will ordinarily not have to be concentrated to dryness, since on concentration and cooling the protonated antibiotic will ordinarily separate as a crystalline salt. The salt formed will depend on the specific acid which is used to protonate the antibiotic during or after the first adsorption e.g., if sulfuric acid is used, the crystalline salt is actinospectacin sulfate.

The antibiotic can also be purified by partition chromatography using the support of diatomite, fuller's earth, silica, cellulose, or like inert, finely divided material, and a two-phase solvent system, for example, butanol:water (preferably with a trace of p-toluene sulfonic acid), methylethylketone:water, and butanol:cyclohexane:water, or by adsorption chromatography using carbon or like adsorbent.

The antibiotic can also be purified by successive transfers from protonated to nonprotonated forms and vice versa, especially with intervening other types of treatments, as for example, recrystallization or those described above. It can also be purified by conversion of the antibiotic, protonated or not, to less soluble forms, for example by reaction with helianthic acid, Reinecke's acid, azobenzene sulfonic acid, picric acid, and the like. The salts thus obtained can be used for the same purpose as the free base, or they can be converted back to the free base and then converted to other salts such as the hydrochloride, phosphate, and sulfate.

Recrystallization is accomplished by dissolving crystalline actinospectacin salt in water, adding a lower alkanone, e.g., acetone, and cooling to induce crystallization. The crystals are filtered and washed with an aqueous alkanone solution and if desired by an anhydrous alkanone, and then vacuum dried.

Actinospectacin either as the free base or as an acid addition salt thereof is also useful in treating mammals and birds to control or mitigate the effect of diseases which affect such animals. For example, the antibiotic, as the free base or salt can be administered in the feed or drinking water of laboratory animals, such as mice and rats, during shipment to act prophylactically in protecting them from *Streptococcus viridans* during shipment. The animals can also be injected parenterally with a sterile aqueous solution of the antibiotic for the same purpose. It can also be used to treat chickens infected with *Salmonella pullorum*. The antibiotic has not yet been established as useful in human therapy.

The salts can be converted to the free base by neutralizing with an alkali or by contacting with an anionic resin to raise the pH above about 8.7, the $pKa_2$ of the antibiotic, and advantageously to about pH 9.5 to 11. Specific acid salts can then be made by neutralizing the free base with the appropriate acid to below about pH 8.7, and advantageously to about pH 5 to 7. Suitable acids for this purpose include hydrochloric, sulfuric, phosphoric, acetic, succinic, maleic and fumaric, methanesulfonic, benzenesulfonic, helianthic, Reinecke's, azobenzenesulfonic, picric acids and the like.

The following examples are illustrative of the process and products of the present invention, but are not to be construed as limiting. All percentages are by weight and all solvent mixture proportions are by volume unless otherwise noted.

EXAMPLE 1

A. Production of actinospectacin

A lyophilized culture of *Streptomyces spectabilis*, NRRL 2792, was used to seed the following sterile agar medium on tubed slants:

| | Grams |
|---|---|
| Maltose | 10 |
| Tryptone | 5 |
| $K_2HPO_4$ | 0.5 |
| NaCl | 0.5 |
| $FeSO_4$ | 0.1 |
| Agar | 20 |
| Deionized water to make 1 liter. | |

The slants were incubated for 7 days at 30° C., after which time sporulation was complete. The spores from the agar slants were used, in an aqueous suspension, to inoculate 100 ml. of preseed medium in a 500 ml. Erlenmeyer flask. The sterile preseed medium consisted of:

| | Grams |
|---|---|
| Dried whole yeast | 10 |
| Glucose | 10 |
| Pancreatic digest of casein (N-Z-Amine B) | 5 |
| Tap water to make 1 liter adjusted to pH 7.2 before sterilizing. | |

The seed flask was incubated for 24 hours at 32° C. on a reciprocating shaker after which it was used as an inoculum for a 20 liter seed fermenter in the amount of approximately 5%. The 20 liter seed fermenter contained a sterile medium consisting of:

| | Grams |
|---|---|
| Glucose | 15 |
| Corn starch | 25 |
| Distiller's solubles | 15 |
| Brewer's yeast | 10 |
| Corn steep liquor | 20 |
| Tap water to make 1 liter adjusted to pH 7.2 before sterilizing. | |

The 20 liter seed fermenter was incubated for 24 hours at 32° C. and aerated at the rate of 6 standard liters or about 0.2 standard cubic feet of air per minute and agitated with a sweep stirrer. The 20 liter seed fermenter was used to inoculate 250 liters of the same medium in a 100 gallon fermentation tank. Twelve hundred milliliters of lard oil were added during the fermentation to control foaming. The tank was agitated with a propeller and aerated at the rate of 75 standard liters of air per minute. After 96 hours of fermentation the beer assayed 500 mcg./ml. (18.3 mcg./mg. on a dry basis) of actinospectacin. Actinospectacin is assayed by its activity against *Klebsiella pneumoniae* by standard agar diffusion procedure and based on crystalline actinospectacin sulfate.

B. *Isolation of actinospectacin sulfate*

The actinospectacin present was then harvested as follows:

The whole beer, 250 liters, was filtered using diatomite as a filter aid. The clear filtrate was passed upwardly through a column containing 40 lbs. of polyacrylic acid-divinylbenzene cation exchange resin in the hydrogen form at a rate such that the resin does not overflow the column but not exceeding 2 liters/min. The particular resin used was a 16 to 50 U.S. mesh bead resin obtained by the suspension polymerization of 95 parts acrylic acid and 5 parts divinylbenzene in the presence of 1 part of benzoyl peroxide in accordance with Kunin, supra. After all the beer had been passed through the resin column, the column was purged with 40 liters of deionized water (pH 5) and then the column was blown dry with air. The resin was slurried with about 5 liters of deionized water, the pH was adjusted to pH 1.8 with sulfuric acid, and the acidified slurry was stirred for about 15 minutes. The eluate was recovered by filtration and the procedure was repeated with another 5 liters of deionized water. The slurry was filtered and the resin blown with air to remove the eluate. The eluate fractions were pooled and the pH was adjusted to pH 6.5 by the addition of an anion exchange resin containing —$NMe_2C_2H_4$—OH groups in the hydroxyl form. The particular resin used was prepared by chloromethylation of uncrosslinked polystyrene beads of 20 to 50 U.S. mesh and quaternarization with dimethylethanolamine according to the procedure of Kunin, supra. The neutralized eluate was separated from the resin by filtration, and further fractionated by carbon chromatography. (The eluate, dried, assayed 120 mcg./mg. of actinospectacin.) A slurry containing 7.5 lbs. activated carbon and 7.5 lbs. of diatomite was packed into a column, 6" in diameter, at a pressure of 10–15 lbs./in.$^2$. The filtered eluate was passed through the column. The column was washed with about 4 holdup volumes (about 40 liters) of water and then eluted with a 1% aqueous acetone solution at the rate of 40 ml./min. in which 152, consecutively numbered, one-liter fractions were taken and asayed. Those fractions assaying greater than 600 mcg./ml. of actinospectacin (fractions 60 to 88) were pooled, concentrated to about 175 ml., and polished by filtration. Crystals were produced by slowly adding, with agitation, 95% aqueous ethanol to an equal volume of the concentrate. On filtration there was recovered 72.5 g. of crystals, assaying 720 mcg./mg. of actinospectacin. A second crop of crystals was obtained from the mother liquor in the same manner yielding an additional 4.2 g., assaying 720 mcg./mg. of actinospectacin. The combined crystalline material was dissolved in 400 ml. of water, the solution was filtered and heated to about 50° C. and 400 ml. of acetone was then added slowly, with stirring, to the aqueous solution. The mixture was refrigerated at 4° C. for 24 hours while crystallization occurred. The crystals were filtered from the solution and washed with about 50 ml. of a 1:1 acetone-water mixture (v./v.) and then with 100 ml. of acetone. On vacuum drying at 25° C., there was obtained 55.5 g. of actinospectacin sulfate dihydrate, assaying 1000 mcg./mg. of actinospectacin, Preparation 1, which on further drying at 100° C. became anhydrous, Preparation 1a.

C. *Characterization of actinospectacin sulfate*

Actinospectacin sulfate, prepared as in B above, exhibited the following characteristic properties:

Antimicrobial Activity (in vitro):

TABLE I

| Test organism (In brain heart broth): | Minimum inhibitory concentration (MIC) [1] (at 20 hrs.) |
|---|---|
| Staphylococcus aureus | 250 |
| Streptococcus hemolyticus | 64 |
| Streptococcus viridans | 500 |
| Streptococcus faecalis | 250 |
| Diplococcus pneumoniae | 64 |
| Pasteurella multocida | 32 |
| Salmonella typhosa | 64 |
| Proteus vulgaris | 250 |
| Escherichia coli | 64 |
| Pseudomonas aeruginosa | 250 |
| Salmonella parathyphi B | 125 |
| Klebsiella pneumoniae | 64 |
| Salmonella pullorum | 64 |
| Staphylococcus albus | 32 |

[1] As mcg./ml.

Antimicrobial Activity (in vivo):

The in vivo antibacterial activity is shown in Table II. The data were obtained in mice and represent the dosage necessary to obtain 50% survival of infected animals. In untreated controls none of the infected mice survived.

TABLE II

| Organism | Median Protective Dose ($CD_{50}$)[1] | |
|---|---|---|
| | Subcutaneous | Oral |
| Staphylococcus aureus | 40 | 314 |
| Streptococcus viridans | 22.5 | 714 |
| Streptococcus hemolyticus | 57 | >800 |
| Diplococcus pneumoniae | 63 | >800 |
| Pasteurella multocida | 194 | >800 |
| Klebsiella multocida | 14 | 355 |
| Escherichia coli | 26 | 112 |
| Proteus vulgaris | 22.5 | 120 |
| Pseudomonas aeruginosa | >320 | >800 |
| Salmonella paratyphi B | >320 | >800 |
| Salmonella typhimurium | 208 | |

[1] As mg./kg./day.

The in vivo testing in mice using actinospectacin showed that the maximum tolerated dose (MTD) was >400 mg./kg. subcutaneously and >1000 mg./kg. orally, and that the $LD_{50}$ intraperitoneally was >2000 mg./kg.

Papergram Analysis:

The characteristic papergram pattern in different solvent systems, in which the active zone is located by bioautography with *K. pneumoniae* is shown in Table III. The liquid to liquid ratios are volume to volume. The solids in liquid percentages are on a gram per milliliter basis.

TABLE III

| Solvent system: | $R_f$ |
|---|---|
| n-Butanol, water (84:16) | 0.025 |
| n-Butanol, water (84:16) plus 0.25% p-toluenesulfonic acid | 0.17 |
| n-butanol, acetic acid, water (2:1:1) | 0.43 |
| 2% piperidine in n-butanol, water (84:16) | 0.2 |

Physical characteristics:

*Elemental analysis.*—Dried at 25° C. C, 36.46; H, 6.94; N, 5.85; O, 46.91; S, 8.22. Dried at 100° C. C, 39.02; H, 6.60; N, 6.08; O, 42.72; S, 7.33.

These analyses best fit the following formulae: $C_{14}H_{26}N_2O_7 \cdot H_2SO_4 \cdot 2H_2O$ and $C_{14}H_{26}N_2O_7 \cdot H_2SO_4$, respectively.

Melting point: Decomposition at approximately 185° C.

Optical Rotation: $[\alpha]_D^{25} = +17°$ ($H_2O$)

Ultraviolet Spectrum: No absorption at 220–400 m$\mu$ ($H_2O$)

Infrared spectrum:

The infrared curve exhibits characteristic absorption at the following frequencies: 3540, 3400, 3250, 3050, 2740, 2470, 1610, 1493, 1420, 1360, 1345, 1330, 1290, 1265, 1240, 1198, 1163, 1133, 1118, 1080, 1065, 1050, 1038, 1012, 996, 982, 973, 962, 940, 896, 870, 848, 705.

Basicity: $pKa_1$ 7.00 ($H_2O$); $pKa_2$ 8.75 ($H_2O$)

Spot tests:
 Anthrone, positive
 Benedicts, negative to slight positive
 Biuret, questionable positive
 Maltol, negative
 Molish, questionable positive
 Ninhydrin, negative
 Sakaguchi, negative X-ray diffraction:

The data listed below shows interplanar spacings, expressed in Angstrom units, characteristic of the sulfate crystals.

PRINCIPAL LINES, A.

| | | | |
|---|---|---|---|
| 9.71 | 4.43 | 3.25 | 2.49 |
| 8.40 | 4.27 | 3.15 | 2.43 |
| 7.37 | 4.04 | 3.05 | 2.36 |
| 6.60 | 3.93 | 2.95 | 2.29 |
| 6.09 | 3.78 | 2.87 | 2.23 |
| 5.63 | 3.65 | 2.74 | 2.20 |
| 5.26 | 3.54 | 2.61 | 2.17 |
| 4.89 | 3.47 | 2.57 | 2.12 |
| 4.74 | 3.37 | 2.51 | 2.06 |
| | | | 1.95 |

EXAMPLE 2

*Formation of actinospectacin free base*

One g. of actinospectacin sulfate, prepared as in Example 1, was dissolved in 10 ml. of boiled water at pH 6.4. The solution was passed through a column containing 10 ml. of the same resin that was used in Example 1b. The column was washed with boiling water (pH 6.4), which had been cooled, to yield 50 ml. of aqueous solution at pH 10.5. This was freeze-dried to yield 500 mg. of actinospectacin free base, Preparation 2.

*Characterization of actinospectacin free base*

Actinospectacin free base, prepared as above, exhibited essentially the same in vitro and in vivo antimicrobial activity as crystalline actinospectacin sulfate, gave the same characteristic papergram pattern, and had the following distinguishing physical and chemical characteristics:

Formula: $C_{14}H_{26}N_2O_7$
Optical Rotation: $[\alpha]_D^{25} = -20°$ ($H_2O$)
Ultraviolet Spectrum: No absorption 220–400 m$\mu$ ($H_2O$)

Infrared spectrum:

The infrared curve exhibits characteristic absorption at the following frequencies: 3380, 3280, 3140, 1733, 1600, 1340, 1290, 1235, 1163, 1115, 1100, 1055, 1020, 953, 925, 855, 845, 805.

Basicity: $pKa_1$ 6.95 ($H_2O$); $pKa_2$ 8.70 ($H_2O$).

Spot tests:
 Benedicts _____ Negative to slight positive.
 Maltol _____ Negative.
 Sakaguchi _____ Negative.

Actinospectacin free base can also be produced by the addition of barium hydroxide to an aqueous solution of actinospectacin sulfate in an amount sufficient to raise the pH to about pH 10.5. The resulting solution is then filtered and dried to yield actinospectacin free base.

EXAMPLE 3

*Preparation of actinospectacin dihydrochloride*

Two g. of actinospectacin free base, prepared according to Example 2, was dissolved in 95 ml. of water. To this solution was added 0.82 ml. of concentrated hydrochloric acid to change the pH from pH 10.0 to pH 6.6. The solution was freeze-dried to yield 2.26 g. of actinospectacin dihydrochloride, Preparation 3, as an amorphous solid.

Actinospectacin dihydrochloride prepared as above had essentially the same in vitro and in vivo antimicrobial activity as the crystalline sulfate.

EXAMPLE 4

*Preparation of actinospectacin phosphate*

Two g. of actinospectacin free base, prepared according to Example 2, was dissolved in 95 ml. of water. To this solution was added 0.4 ml. of concentrated phosphoric acid to change the pH from pH 10 to pH 6.5. The solution was freeze-dried to yield 2.74 g. of actinospectacin phosphate, Preparation 4, as an amorphous solid.

Actinospectacin phosphate prepared as above has essentially the same in vitro and in vivo antimicrobial activity as the crystalline sulfate.

EXAMPLE 5

*Preparation of actinospectacin dihelianthate*

To 500 mg. of actinospectacin sulfate, prepared according to Example 1, dissolved in 10 ml. of water was added 500 mg. of methyl orange dissolved in 15 ml. of hot water. A crystalline precipitate formed immediately. The solution was allowed to cool for two hours at 4° C. The crystals were removed by filtration and washed with water. The washed crystals were dissolved in 70 ml. of methanol and 20 ml. of water was added. The solution was allowed to stand overnight at about 4° C. while crystallization occurred. The crystals were recovered by filtration, washed with water and vacuum dried to yield 200 mg. of crystalline actinospectacin dihelianthate, Preparation 5, which had a melting point of 220–225° C. This material also has antibacterial activity similar to the crystalline actinospectacin sulfate. On dissolving in aqueous methanol as above and neutralizing with an anion exchange resin in the hydroxyl form as in Example 2, actinospectacin free base of a high degree of purity is obtained.

We claim:

1. A composition of matter, assaying at least 18.3 mcg./mg. of actinospectacin, selected from the group consisting of (1) actinospectacin free base, a basic substance soluble in water, methanol, and ethanol and insoluble in acetone and hydrocarbon solvents effective in inhibiting the growth of gram negative and gram positive bacteria, which in the form of its pure crystalline sulfate, is characterized by the formula $C_{14}H_{26}N_2O_{11}S$ and an elemental analysis of approximately 39 percent carbon, 6.6 percent hydrogen, 6 percent nitrogen, 42.7 percent oxygen and 7.3 percent sulfur; by no ultraviolet absorption between 220 m$\mu$ and 400 m$\mu$; and by an infrared absorption spectrum substantially as shown in FIGURE 1; and (2) the acid addition salts of said basic substance.

2. A compound in its essentially pure form selected from the class consisting of actinospectacin free base and the acid addition salts thereof as defined in claim 1.

3. An acid salt of actinospectacin as defined in claim 1.

4. A compound according to claim 3 in its essentially pure crystalline form.

5. The dihydrochloride of actinospectacin as defined in claim 1.

6. The sulfate of actinospectacin as defined in claim 1.

7. The compound of claim 6 in its essentially pure crystalline form.

8. The phosphate of actinospectacin as defined in claim 1.

9. The dihelianthate of actinospectacin as defined in claim 1.

10. An antibiotic which
(1) is a base
(2) inhibits gram negative and gram positive bacteria
(3) has a formula of $C_{14}H_{26}N_2O_7$
(4) has no ultraviolet absorption spectrum between 220 m$\mu$ and 400 m$\mu$
(5) has a sulfate salt, which salt has X-ray diffraction data as follows: $d=$9.71, 8.40, 7.37, 6.60, 6.09, 5.63, 5.26, 4.89, 4.74, 4.43, 4.27, 4.04 3.93, 3.78, 3.65, 3.54, 3.47, 3.37, 3.25, 3.15, 3.05, 2.95, 2.87, 2.74, 2.61, 2.57, 2.51, 2.49, 2.43, 2.36, 2.29, 2.23, 2.20, 2.17, 2.12, 2.06, 1.95
(6) and which sulfate salt has the following infra-red absorption bands expressed in cm$^{-1}$: 3540, 3400, 3250, 3050, 2740, 2470, 1610, 1493, 1420, 1360, 1345, 1330, 1290, 1265, 1240, 1198, 1163, 1133, 1118, 1080, 1065, 1050, 1038, 1012, 996, 982, 973, 962, 940, 896, 870, 848, 705.
(7) has the following pKa values: 7.0 and 8.75.

11. A process which comprises cultivating under aerobic conditions actinospectacin producing strain of *Streptomyces spectabilis* selected from the group consisting of *Streptomyces spectabilis* NRRL 2494 and *Streptomyces spectabilis* NRRL 2792 in an aqueous nutrient medium at a temperature of about 18° C. to about 37° C. for a period between about 2 to 10 days until substantial actinospectacin activity is imparted to said medium by production of actinospectacin, separating the actinospectacin from the culture medium by adsorption of the actinospectacin, in protonated form, on a cation exchange resin in the hydrogen form and eluting actinospectacin therefrom with a protonating solvent.

12. A process for the recovery of actinospectacin as defined in claim 1 from an aqueous solution containing the same which comprises contacting the aqueous solution at a pH between about pH 5 and 7 with a cation exchange resin in the hydrogen form and eluting the adsorbed actinospectacin therefrom with an aqueous solution of a strong non-oxidizing mineral acid at a pH below the pKa of the resin.

13. A process for the production of actinospectacin as defined in claim 1 which comprises cultivating an actinospectacin producing strain of *Streptomyces spectabilis* selected from the group consisting of *Streptomyces spectabilis* NRRL 2494 and *Streptomyces spectabilis* NRRL 2792 in an aqueous nutrient medium under aerobic conditions until substantial actinospectacin activity is imparted to said medium by production of actinospectacin and isolating from the culture medium a composition of matter according to claim 1.

References Cited by the Examiner

FOREIGN PATENTS 811,757   4/1959   Great Britain.

OTHER REFERENCES

Mann et al.: J.A.C.S., Jan. 5, 1958, pages 2714–2716.

JULIAN S. LEVITT, *Primary Examiner.*

MORRIS O. WOLK, *Examiner.*

FRANK CACCIAPAGLIA, JR., D. LEVY,
*Assistant Examiners.*